United States Patent
Kuorelahti et al.

(10) Patent No.: US 6,466,665 B1
(45) Date of Patent: Oct. 15, 2002

(54) METHOD FOR CONCENTRATING SUBSCRIBERS IN A LOCAL EXCHANGE

(75) Inventors: Seppo Kuorelahti, Helsinki; Martti Yrjänä, Tupos; Reijo Romppanen, Oulu; Pekka Korhonen, Oulu; Toivo Lallukka, Oulu, all of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/571,966

(22) Filed: May 16, 2000

Related U.S. Application Data

(63) Continuation of application No. PCT/FI98/00910, filed on Nov. 20, 1998.

(30) Foreign Application Priority Data

Nov. 24, 1997 (FI) .................................................. 974311

(51) Int. Cl.$^7$ ................................................ H04M 3/00
(52) U.S. Cl. ..................................... 379/333; 379/334
(58) Field of Search ................................ 379/333, 334, 379/219

(56) References Cited

U.S. PATENT DOCUMENTS 6,278,700 B1 * 8/2001 Haster ......................... 370/329

FOREIGN PATENT DOCUMENTS

| DE | 195 24 029 C1 | * 11/1996 | .......... H04Q/3/545 |
|----|---|---|---|
| EP | 077 9757 | 6/1997 | |
| WO | 97/16936 | 5/1997 | |
| WO | 97/18687 | 5/1997 | |

OTHER PUBLICATIONS

ETS 300 324–1, "Signalling Protocols and Switching (SPS); V interfaces at the digital Local Exchange (LE) V5.1 interface for the support of Access Network (AN) Part 1: V5.1 interface specification", *European Telecommunications Standards Institute*, Feb. 1994.

ETS 300 347–1, "Signalling Protocols and Switching (SPS); V interfaces at the digital Local Exchange (LE) V5.2 interface for the support of Access Network (AN) Part 1: V5.2 interface specification", *European Telecommunications Standards Institute*, Sep. 1994.

"V5 Interfaces between Digital Local Exchanges and Access Networks" Khakzar, Frequenz 4X 1994.

"Interfacing Access Networks to Exchanges:–The ETSI V5 Approach" Gillespie, IEEE Global Telecommunication Conference, vol. 3, 12/92.

* cited by examiner

*Primary Examiner*—Ahmad F. Matar
*Assistant Examiner*—Hector Agdeppa
(74) *Attorney, Agent, or Firm*—Altera Law Group, LLC

(57) ABSTRACT

Method for concentrating subscribers in a local exchange (LE), which comprises an exchange terminal (1), a V5 interface (V5) connected to the exchange terminal, a group switch (3) and an interconnecting line (4) between the exchange terminal and the group switch for connecting subscribers connected to the exchange terminal to the group switch. According to the invention, a number of V5 interfaces (V5) are connected to the exchange terminal (1) and the exchange terminal is connected to the group switch (3) via the interconnecting line (4), thus forming between the exchange terminal and the group switch an internal interface within the local exchange for concentrating V5 subscribers.

8 Claims, 1 Drawing Sheet

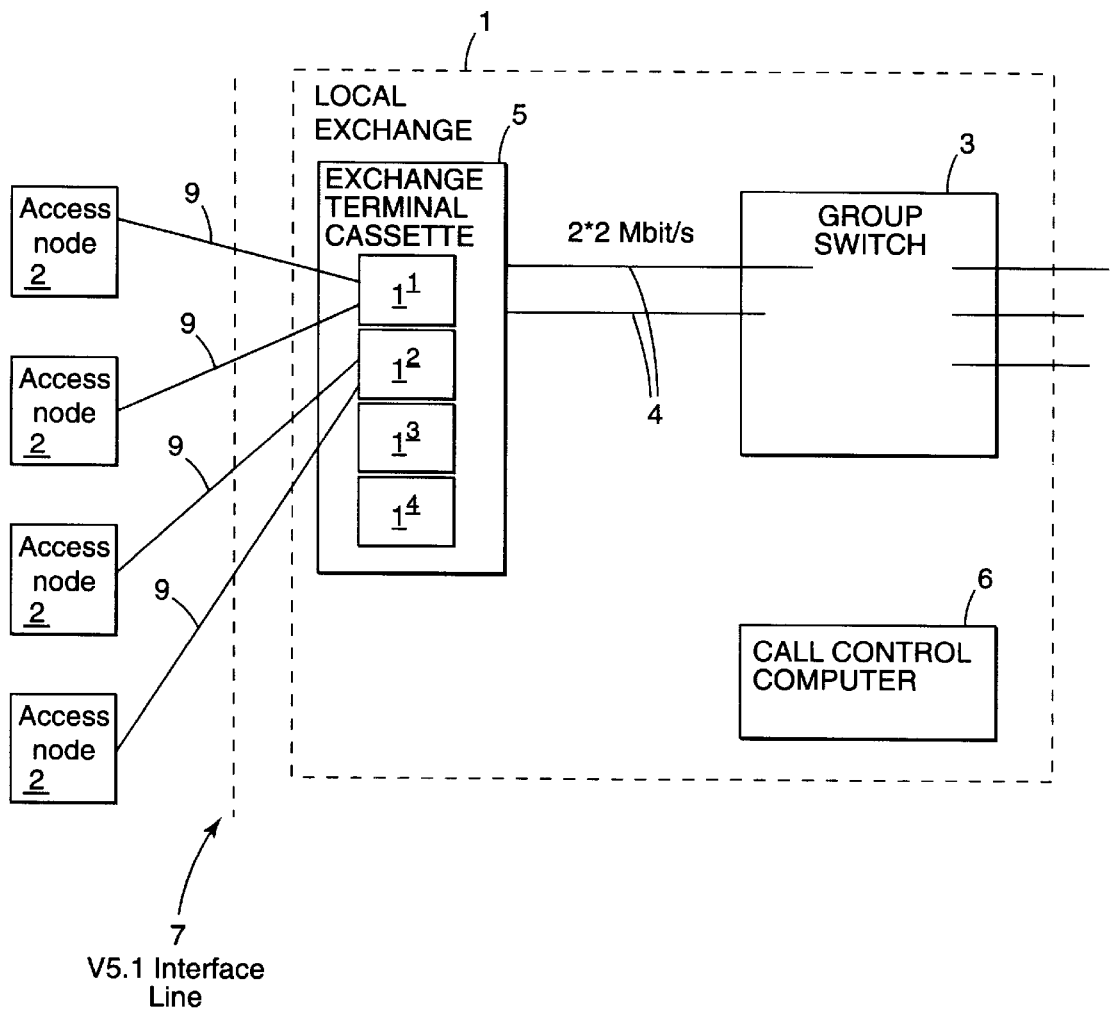

METHOD FOR CONCENTRATING SUBSCRIBERS IN A LOCAL EXCHANGE

This application is a continuation of PCT/FI98/00910, filed Nov. 20, 1998.

BACKGROUND OF THE INVENTION

1. Field of the Invention

The present invention relates to a method for concentrating subscribers in a local exchange.

2. Description of the Related Art

V5 interface standards ETS 300 324 and ETS 300 347 describe an interface between a local exchange and an access network and the functionality in each network element. The access network is the part of a local area network that contains the subscriber's lines. Thus, subscribers and subscriber's lines can be connected to the exchange either directly (direct subscribers) or via various multiplexers and/or concentrators. V5 interfaces enable subscribers belonging to a physically separate access network to be connected to a local exchange using a standard interface.

A static V5.1 multiplexer interface consistent with the ETS 300 324 standard series consists of one 2048 kbit/s PCM line. The V5.1 interface supports analogue telephones as used in the public telephone network, digital, such as ISDN (Integrated Services Digital Network) basic subscriber lines as well as other analogue or digital terminal equipment based on semifixed connections.

At present, the V5.1 interface is implemented in the local exchange in a manner that permits one V5.1 concentrator to be connected to one exchange terminal. The exchange terminal is further connected to the group switch of the local exchange via a single PCM line with a transmission capacity corresponding to that of the V5.1 interface, which preferably is 2 Mbit/s. Thus, the link between the exchange terminal and the group switch comprises no concentration of speech time slots, i.e. B-channels, because the V5.1 interface contains as many time slots as the interconnecting line between the exchange terminal and the group switch, preferably 30 time slots.

Therefore, these circumstances involve the problem that, if a plurality of V5.1 interfaces are to be connected to the local exchange, the latter must be provided with as many exchange terminals, thus increasing the size and cost of the local exchange.

SUMMARY OF THE INVENTION

The object of the present invention is to eliminate the problem described above. A specific object of the present invention is to produce a solution in which concentration of time slots is implemented between the exchange terminal and the group switch and the number of exchange terminals in the local exchange is reduced.

As for the features characteristic of the invention, reference is made to the claims.

In the method of the invention for concentrating subscribers, preferably V5 subscribers in a local exchange, the subscribers are connected to the group switch via a link between an exchange terminal and the group switch, said link being preferably implemented using one or more PCM lines with a capacity of 2 Mbit/s. The local exchange preferably comprises an exchange terminal that serves to form a V5 interface in the exchange, and a group switch known in itself.

According to the invention, several V5 interfaces are connected to a single exchange terminal and the exchange terminal is connected to the group switch via an interconnecting line, thus forming between the exchange terminal and the group switch an internal interface within the local exchange for concentrating V5 subscribers. The degree of concentration can be further increased by combining a number of exchange terminals into a single exchange terminal cassette, which is further connected to the group switch via a single interconnecting line. A limiting factor in the concentration of subscribers is the capacity they need, which has to be checked when concentration is being planned.

As compared with prior art, the present invention has the advantage that it allows concentration that makes it possible to reduce the exchange terminal capacity needed for V5.1 subscribers in the local exchange. Moreover, the invention enables the wiring and structures in the local exchange to be simplified, which further reduces the costs and facilitates the assembly of a local exchange.

The exchange terminal used is preferably a V5.1 subscriber module controller. In addition, time slot data and/or V5 interface data regarding the V5 interface used by the subscriber is/are stored in a subscriber database, said data being used when scanning and designating a free time slot for the subscriber in the interconnecting line between the group switch and the exchange terminal during call setup. Information regarding the time slot designated for the subscriber in the interconnecting line is supplied to the exchange terminal to which the V5 interface used by the subscriber is connected, so that the exchange terminal will be able to connect the subscriber's V5 interface time slot to the correct time slot in the interconnecting line between the exchange terminal and the group switch. The designation of a time slot in the interconnecting line is preferably done specifically for each call, which means dynamic allocation of resources in the interconnecting line.

The access network is preferably connected to the local exchange via a V5 interface. This V5 interface may be a standard V5.1 or V5.2 interface.

BRIEF DESCRIPTION OF THE DRAWINGS

In the following, the invention will be described by referring to the attached drawing, which illustrates a system according to a preferred embodiment of the present invention.

The FIGURE is a block diagram of a local exchange according to an embodiment of the invention.

DETAILED DESCRIPTION OF THE INVENTION

The drawing shows a diagram representing a local exchange 1 and four access nodes 2 connected to it. The local exchange 1 comprises an exchange terminal cassette 5 with four exchange terminals $1^1$, $1^2$, $1^3$, $1^4$ incorporated in it. The local exchange 1 also comprises a group switch 3, which is connected to the exchange terminal cassette 5 via two interconnecting PCM lines 4. Moreover, the drawing shows a call control computer 6, which is used to control the group switch 3 and call setup in general, however, the interconnection of the call control computer 6 to the other components of the local exchange 1 is not shown in the figure.

In the drawing, the access nodes 2 are connected via a V5.1 interface line 7 to exchange terminals $1^1$ and $1^2$. Thus, each one of these exchange terminals receives two PCM lines 9, each with a capacity of 30 channels or time slots. The exchange terminal cassette 5 is further connected to the group switch 3 via two PCM lines 4, each having a capacity of 30 time slots or channels, i.e. 2 Mbits/s. Therefore, an interface (not shown) concentrating the V5 subscribers is formed between the exchange terminal cassette 5 and the group switch 3. In this example, the subscriber concentration ratio is 240/60, in other words, 60 channels are reserved for 240 subscribers.

The V5 interface software is mainly disposed in the call control computer 6 of the local exchange 1. In the exchange terminals $1^1$ and $1^2$, for example, through switching occurs from the V5.1 interface line 7 to the interconnecting PCM line 4 between the exchange terminal cassette 5 and the group switch 3. In the local exchange 1, when a subscriber is being created, a time slot in the V5.1 interface line 7 is designated for the subscriber and the time slot data is stored in the subscriber database, (not shown), which generally is disposed in the local exchange 1. During call setup, the signalling software of the local exchange 1 transmits the subscriber's V5.1 interface speech time slot and time slot it has scanned in the interconnecting PCM line 4 between the exchange terminal cassette 5 and the group switch 3 to the exchange terminal, $1^1$ or $1^2$, for example, for through switching. The exchange terminal, $1^1$ or $1^2$, for example, performs the through switching.

The invention is not restricted to the examples of its embodiments described above. Many variations are therefore possible within the sphere of protection defined by the claims.

What is claimed is:

1. Method for concentrating subscribers in a local exchange (LE), which comprises an exchange terminal (1), a V5 interface (V5) connected to the exchange terminal, a group switch (3) and an interconnecting line (4) between the exchange terminal and the group switch for connecting subscribers connected to the exchange terminal to the group switch, characterised in that a number of V5 interfaces (V5) are connected to the exchange terminal (1) and the exchange terminal is connected to the group switch (3) via the interconnecting line (4), thus forming between the exchange terminal and the group switch an internal interface within the local exchange for concentrating V5 subscribers.

2. Method as defined in claim 1, characterised in that a number of exchange terminals ($1^1$, $1^2$, ... , $1^n$) are incorporated in the same exchange terminal cassette (5) and the exchange terminal cassette is connected to the group switch (3) via the interconnecting line (4).

3. Method as defined in claim 1, characterised in that the exchange terminal (1) used is a V5.1 subscriber module controller (2).

4. Method as defined in claim 1, characterised in that, when a subscriber is being created, time slot data and/or V5 interface data regarding the V5 interface used by the subscriber is/are stored in a subscriber database.

5. Method as defined in claim 1, characterised in that, during call setup, a free time slot in the interconnecting line (3) is scanned and designated for the subscriber.

6. Method as defined in claim 1, characterised in that information regarding the time slot designated for the subscriber in the interconnecting line (3) and the time slot designated in the V5 interface is supplied to the exchange terminal to which the V5 interface used by the subscriber is connected.

7. Method as defined in claim 1, characterised in that the access node (AN) is connected via a V5 interface to the local exchange (LE).

8. Method as defined in claim 1, characterised in that a V5 interface is used that is a standard V5.1 interface or a standard V5.2 interface.

* * * * *